March 20, 1945.   R. P. CARLTON ET AL   2,371,605
COATING, PARTICULARLY FOR MANUFACTURE OF ABRASIVES
Original Filed June 1, 1933   5 Sheets-Sheet 1

Inventors:
Richard Paul Carlton &
Theodore Joseph Miller
By: Paul Carpenter
Atty.

Inventors:
Richard Paul Carlton
Theodore Joseph Miller
By Paul Carpenter
Atty.

March 20, 1945. R. P. CARLTON ET AL 2,371,605
COATING, PARTICULARLY FOR MANUFACTURE OF ABRASIVES
Original Filed June 1, 1933    5 Sheets-Sheet 3

Inventors:
Richard Paul Carlton
Theodore Joseph Miller
By: Paul Carpenter
Atty.

Patented Mar. 20, 1945

2,371,605

UNITED STATES PATENT OFFICE 2,371,605

COATING, PARTICULARLY FOR MANUFACTURE OF ABRASIVES

Richard Paul Carlton and Theodore Joseph Miller, St. Paul, Minn., assignors to Minnesota Mining & Manufacturing Company, St. Paul, Minn., a corporation of Delaware Original application June 1, 1933, Serial No. 673,886. Divided and this application March 31, 1938, Serial No. 200,550

8 Claims. (Cl. 117—17)

This application is a division of our copending application, Serial No. 673,886, filed June 1, 1933. This invention relates broadly to coating and coating materials especially in sheet form, such as in the manufacture of abrasives, and the present invention among other things finds utility in one of its phases in the manufacture of abrasive wheels or discs, and while the invention in one of its forms is illustrated as adapted for coating and forming an abrasive disc, it will be understood that certain other phases of the invention are of quite general application and may be adapted for other purposes, such, for example, as a method of coating roofing material with pulverulent mineral.

This invention, as will hereinafter appear, finds especial utility in the production of grinding discs wherein the abrading surface is on a side thereof rather than on the periphery; and the invention also finds utility in coating roofing material so that particles of mineral deposited thereon are caused to lie flat, that is to say, with their major dimensions substantially parallel with the surface of the backing.

The customary procedure generally resorted to in the manufacture of abrasive wheels, discs and the like generally includes the mixing of an abrasive grit, such as aluminum oxide, silicon carbide or emery, with a suitable bonding material and then placing the mixture in a mold. The final setting up of the bonding material is then effected by curing at a sufficient temperature to cause the bond to flow and take a firm grip of the abrasive grit. Several different forms of the adhesive or bonding material are used, the more common being that known as a vitrified or ceramic bond. In making such a wheel it is necessary to fire the wheel, that is to say, subject the mixture of bonding material and grit to a sufficiently high temperature to cause the bonding material to flow and thus, in effect, form a porcelain bond between the various particles of grit. Obviously, such a wheel or disc is inflexible, broadly, and will not stand shock or sudden thrusts.

It has been proposed to employ as substitute bonds for the vitrified or ceramic bond, materials such as rubber, shellac, sodium silicate, natural and synthetic resins and the like.

In producing an abrasive disc or wheel, aside from the problems of choice of bond, there is also the necessity of controlling the ratio of bonding material to abrasive material, and it is also highly desirable that, in certain forms of the abrasive wheel or disc structure, more or less porosity or voids in the wheel acting as clearances for the material being abraded be provided so that fast and continuous cutting, together with reduction in temperature of the wheel when engaging the work, should be attained. In obtaining these desiderata it is found that the porosity of the wheel in the case of a molded structure tends to weaken the disc or wheel and, due to the porosity, the structure does not have sufficient bond to firmly anchor the grit therein.

The principal objects and advantages of the present invention reside in the provision of an improved method of manufacturing an abrasive wheel, disc or the like having characteristics in its structure which increase the cutting ability, strength and durability of the device; the provision of an improved method of manufacturing an abrasive article such as a wheel or disc for abrading purposes, in which the cost of manufacture is considerably reduced, with the attendant accomplishment of the desired control of ratio or bond, that is to say, adhesive, to the mineral or grit, and to provide such an improved method in which the same may be carried out as a substantially continuous process, thus simplifying the manufacture and reducing the ultimate costs; the provision of an improved method of manufacturing abrasive wheels and discs in which a fabric such as paper, cloth or the like may be employed as a carrier for the bond and grit and in which the ultimate size of the abrading wheel or disc may be determined easily and by a substantially continuous method; the provision of an improved form of abrading wheel or disc wherein a controlled porosity of the structure is obtained and wherein the ratio of adhesive material to grit is substantially uniform throughout the entire wheel or disc; the provision of an improved abrasive article such as a wheel or disc wherein the grit particles are oriented so that their most effective cutting edges are presented at the abrading surface and thus are brought into contact with the work more efficiently; the provision of an improved method of manufacturing abrasive discs, wheels and the like in which the production of the abrasive article may be carried out on existing sandpaper type of equipment, with the subsequent convenience of shortening the required time for producing various sizes of abrasive wheels and discs.

A further advantage of this invention resides in that, as distinguished from the molding process of making abrasive discs and wheels, which requires that the abrasive grit and bonding material be mixed in the proper ratio, then molded, then heated, and therefore requiring each separate size of wheel or batch to be handled completely individually from the beginning to the end of the entire fabrication process, the present invention permits of the carrying out of a substantially continuous process similar to the manufacture of sandpaper and that continuous lengths of the material may be stored in drums or rolls from which the desired width of strip may be cut which is to determine the ultimate thickness of the wheel, it being assured at all times that the ratio of abrasive material to bonding material will remain substantially uniform throughout the particular wheel or disc structure which it is desired to form.

The present invention also permits of the manufacture of the basic abrasive material on standard sandpaper equipment and that this material may, after having been prepared, be preserved in stabilized form for use in manufacturing wheels as desired, the process and the article thus permitting of the production of one or more wheels of a desired size and texture, that is to say, grit size or number, at less cost and more conveniently than is possible with the previous processes known to us.

It has also been suggested in the prior art that abrasive discs and wheels be made up of a series of superposed discs of ordinary sandpaper, emery paper or cloth or the like glued together and subjected to pressure and heat, but in such prior process and articles made therefrom known to me considerable waste occurs in that the discs must be cut from a standard made piece of sandpaper, and the portion thus made and not used must be thrown away. The present invention distinguishes from such process in that there is substantially no waste of abrasive material which is attendant upon any dieing out process, hitherto suggested.

The present invention also has as one of its objects the provision of an improved method of producing a flexible abrasive article and the resultant article so that, as desired, the manufacturer may produce an abrasive article of the desired degree of flexibility, and, at the same time, have a substantially homogeneous structure with a substantially continuous abrading surface.

The present invention also contemplates the employment therein and for the production of the abrasive article of a new process of orienting the abrasive grains so that their sharper points will be presented at the abrading surface. In ordinary sandpaper the abrasive grains are deposited on the adhesive coated sheet by gravity and as a result lie in haphazard fashion in the adhesive.

In the present invention it is desirable that the abrasive grains be oriented so as to present the longitudinal axes of the individual particles in a position substantially parallel with the plane of the sheet and substantially perpendicular to the margins thereof so that when the abrasive article is formed from a sheet of abrasive material made according to this invention, to form an abrasive disc, the sharper points of the grains will be presented at the margins at each of the convolutions of the disc.

This orientation of the grains may be conveniently accomplished by the action of an electrical field, and it is therefore one of the further objects of this invention to provide an improved method of and apparatus for subjecting the abrasive grains to the action of an electrical field for the purpose of attaining the desired orientation of such particles; the invention further has as one of its objects the improved method of and apparatus for subjecting the abrasive grains during the flight by gravity to the sheet to the effect of an electrical field, preferably of the electrostatic type, for aligning the particles with the lines of force of the field, which for convenience lie substantially parallel with the surface of the abrasive sheet, thus orienting the grains in the proper desired manner as they are deposited thereon.

This invention also contemplates the improved method of incorporating the grit particles in an adhesive in plastic form, and while the same is deposited together with the grit on a flexible backing subjecting the incorporated grit and adhesive to the action of an electrical field for aligning the particles and orienting the same in the desired manner.

The method involved in the present invention may be carried out in a number of alternative steps, depending upon the form and characteristics as to flexibility and denseness which it is desired to impart to the finished article.

A preferred method of producing the abrasive article of this invention includes the selection of a fabric, preferably paper, of a desired and suitable weight, coating this paper with a bonding material and a suitable grit. For our purposes, we prefer to employ a waterproof bond, and, for example, this may be any of the bonds described and claimed in the patents to Okie 1,565,027, 1,565,028, 1,635,801, Carlton 1,775,631, 1,736,964.

This paper thus coated with a waterproof bond and a suitable grit may be of the same characteristics as the waterproof sandpaper now known to the trade as "Wetordry."

The coated fabric, preferably paper, having the grit contained in the adhesive layer may be provided with a light or heavy sizing coat, depending on the use to which the material is to be applied, though in most instances a sizing coat may be omitted.

After the bond and adhesive or grit have been applied, the material is then festooned for a sufficient period of time to dry or partially solidify the adhesive. It is preferable that the adhesive be not set to its final condition at this time but to aid in handling the adhesive should be dried to a degree which will prevent accidental displacement of the grit.

The abrasive sheet thus formed may be rolled into what are known as jumbo rolls and may be stored until required for slitting into suitable widths. When it is desired to complete a grinding disc with this material the same may be slit to any desired width which is to be the depth of the disc or wheel and then wound into rolls of the required diameter. Owing to the fact that the adhesive material is not entirely set when the sheet is wound into a roll, the disc or wheel thus formed may be placed in an oven for further drying and for completely setting up the bond.

By regulating the tension of the strip of abrasive material as it is wound into disc-like form the compactness and resultant flexibility of the final product may be desirably controlled.

It will be understood, of course, that the resultant flexibility of the article is more or less dependent upon the type of adhesive employed, and that by controlling the flexibility of the adhesive and the tension upon winding the ultimate flexibility of the article may be regulated. As to the waterproof qualities of the article, excellent results may be obtained by employing any of the binders disclosed in the patents mentioned herein.

In the actual finished disc material thus produced particularly where the strip of adhesive material is relatively loosely wound to form a disc, the convolutions thereof will afford clearance spaces, though they may at numerous points be adhering together by virtue of the adjacent layers of the adhesive. In the actual finished article we thus are able to produce an abrading surface which has sufficient flexibility as to binder and composite to facilitate surface sanding, as it is called, and also to facilitate clearing of the wheel when it is in use.

We have found that in some cases of flexible discs or wheels it may be desirable to cement the layers or convolutions of the disc together, but this is not the preferred practice for the normal surface sanding job, and we have found that for such purposes merely winding the strip of material upon itself and then attaching it to a suitable backing, preferably flexible in nature, will produce a grinding wheel or disc giving a desirable flexibility and an efficient cutting surface.

In instances where it is desired to make a solid wheel, that is, a relatively inflexible wheel or disc, it may be desirable to cement the laminations, layers or convolutions, as they may be termed, and this may be accomplished by interposing a sizing coat as the strip is wound into the disc form. It also may be desirable in some instances to apply the sizing material in a relatively heavy coating and to subject the article to heat for causing the coating to flow, and thus relatively intimately connect adjacent layers of the abrasive material.

This operation may also be accomplished when the disc is wound by immersing the same in a bath of adhesive size to permit the adhesive material to flow of capillary action between the laminations or convolutions of the disc.

One of the important factors which effect flexibility when the disc is not of the solid type is the degree of tightness of winding, and thus by relatively loosely winding the strip of adhesive material it is possible ultimately to obtain a very flexible abrasive disc.

It is important in the production of a grinding or polishing disc or wheel of the character herein disclosed that the ratio of mineral grit to adhesive be controlled to produce the most desirable coating results and also that the uniformity of this ratio throughout the disc be maintained. By the abrasive article of this invention and the method of manufacturing the same, we are enabled to attain a high degree of efficiency in cutting operations of the disc and to give to the abrasive article a substantially uniform effective abrasive surface throughout, so that as the same becomes worn in service it yet renders the same efficient cutting and/or abrading or polishing functions.

It will be understood, of course that dependent upon the desired characteristics of the finished product, we may employ fine, medium or coarse grits and that, correspondingly, the thickness of paper or other fabric employed and the ratio of adhesive to grit or abrasive particles must be controlled in each instance to the desired degree. In certain instances we applied the adhesive and abrasive coatings to both sides of the backing.

In selecting an adhesive material, we have obtained excellent results with adhesives formed as composite materials from Bakelite, that is, phenol and formaldehyde and other synthetic resin binders, rubber, shellac and the like, it being understood that these materials may be made into a liquid adhesive and can be further molded or softened by subsequent flowing under heat in such manner that a thorough setting or curing of the adhesive is accomplished without detracting from the flexibility thereof.

One example of an adhesive which is suitable for our purpose is that substantially according to the following formula:

| | Parts |
|---|---|
| Bakelite resin | 4 |
| Thinner (denatured alcohol) | 1 |

This composition is agitated very thoroughly until a creamy fluid possessing some tackiness is produced. This adhesive is then applied to the sheet which then receives the abrasive material.

In the case of a Bakelite resinous material, the adhesive is dried after having received the mineral either on the racks or festoons or at some other point in the production of the abrasive strip, and we prefer to employ temperatures ranging from normal atmospheric room temperature to approximately 140 degrees Fahrenheit, depending on the length of time of drying. In this drying operation the temperature is maintained at such a point that the thinner or solvent only will be driven off and thus no appreciable hardening or solidifying reaction takes place in the resin at this time. When the strips are coated with this material together with a binder, heat treated as set out above and then wound into discs or wheels, they may be further subjected to heat which causes a flowing of the resinous binder and thus sufficiently unites the several convolutions or laminations of the wheel. Of course, if it is desired to make a substantially rigid wheel in this manner, same may be tightly wound and also subjected to pressure as well as heat subsequently.

When employing a synthetic resinous material such as a Bakelite resin, the same is thinned with a suitable thinner and coated on the sheet in the same manner as that employed in conventionally forming sandpaper. The grit is then applied as quickly after the binder application as may be practicable. The thinners are evaporated at normal temperatures, and the bond thereupon solidifies to the consistency of a varnish partially dried but tack free.

The abrasive article in this condition may then be stored in large rolls and cut or slit into ribbon disc portions as required.

In order to insure flexibility of the abrasive article during handling, it is preferred that the rolls be stored in a humid atmosphere, so that the article will be possessed of flexibility during the heating operation.

After the abrasive material is cut and formed into ribbon discs, the bond may be toughened by further heat treatment at, say, 180 to 185 degrees Fahrenheit for approximately fifteen minutes, which produces a flexible consistency and is suitable for some purposes, or, we may employ temperatures ranging from 250 to 300 degrees Fahrenheit for a period of time of from fifteen minutes to one hour to produce a relatively hard bond in which there is substantially no flexibility in the binder coat itself. Where a flexible binding coat is desired, a proper regulation of the temperatures and employment of suitable modifiers in the Bakelite resin will give satisfactory results.

It will be understood that the preference to storing the abrasive in large rolls, jumbo rolls, as they are called, is that sometimes it is difficult to synchronize the heating operation with the drying festoons, and for some purposes it is preferred that the abrasive sheet as it is formed be placed in jumbo rolls so that it may be slit to the desired widths as required.

In connection with the foregoing formula we have secured a flexible abrasive strip to be wound into a disc or wheel shape by employing a Bakelite material which does not produce a complete reaction to rigidity or by keeping the temperature below 212° F. and reducing the time of heat treatment.

For the purposes of this invention we prefer to employ a flexible binding material on the flexible backing, but it is to be understood that a satisfactory flexible wheel or disc may be produced employing a relatively less flexible binder by keeping the layers or laminations of the wheel separated.

We have made satisfactory abrasive wheels or discs by employing an adhesive of the varnish type such as is disclosed in the patents to Okie hereinabove referred to, and we have also employed as a binder the material disclosed in the application of Carlton and Oakes, S. N. 660,319.

Where rubber, shellac or synthetic resins other than Bakelite are employed, we also prefer to heat treat the same in the final setting or, if necessary, after first applying the binder to the strip which is to be later wound into the disc form. With rubber, sulphur is added in desired amount to the adhesive material so that the vulcanization of the binder takes place in the heating step.

Under some circumstances, in order to prevent starving of the bond between the grit and the sheet, it is desirable to apply sizing coat to the back of the sheet, and this may be done during the winding of the sheet or after the original process of making the sheet simultaneously with the application of the adhesive and grit.

The outstanding advantages of the present invention, particularly where the same is wound into a roll to form a disc or wheel, reside in that we are enabled to produce a laminated abrasive structure in which the abrading surface presents a more definite and more uniform porosity due to the laminations and due to the spot contacting of the adhesive on one layer with the adjacent layer, and thus producing a greater proportion of voids than is possible or obtainable where abrasive grit and a bond are molded even where equal ratios of bond to grit are employed. Our invention also produces a laminated abrasive structure having an increased strength due to the incorporation therein of the coated backing of fabric such as paper or cloth, which adds to the strength of the entire wheel making the same less brittle and more flexible and permitting of thinner wheels to be prepared than by any other prior method known to us.

Another distinct advantage of our invention resides in the fact that the mineral grits, owing to their elongated nature, may be oriented on the abrading device so that their sharp points are presented at the abrading surface. For some purposes it is desirable to deposit the abrasive grit by an electrical field or other electrical action, such as by an electrostatic field, in such a manner that the grits will become oriented with their major axes parallel to the surface of the sheet and perpendicular to the abrading surface, particularly where the grits are placed so that their major axes are perpendicular to the margins of the strip from which the wheel is wound. We shall describe such a process of deposition of the grits more fully hereinafter.

It will be understood, of course, that after the abrasive strip has been wound to the desired diameter and with the desired degree of tightness, a suitable disc backing may be affixed by a waterproof binder if desired on one surface of the resultant abrasive disc so that the disc may be mounted on a suitable shaft for imparting rotation thereto.

The several methods which may be employed in the manufacture of the abrasive article itself are illustrated in the accompanying drawings, in which—

Figure 1:
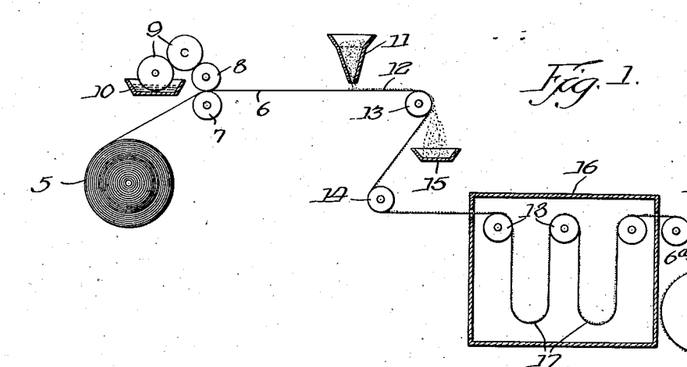
Figure 1 is a schematic view of an apparatus which may be employed for producing the abrasive article of this invention.
Figure 8:
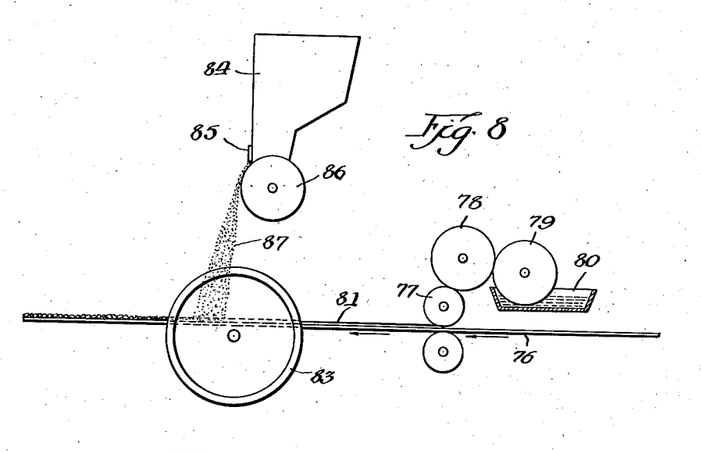
Figure 8 is a schematic view of an alternative form of apparatus for securing orientation of the abrasive particles.

Referring now more particularly to the drawings, and first to Figure 1, there is shown a roll of fabric such as paper or cloth 5, from which the web 6 is unwound over an idler roller 7, to receive from a coating roll 8 a layer of the adhesive material delivered by the series of feed rolls 9 from a tank 10. The web 6 is fed beneath a hopper 11 from which is supplied a quantity of comminuted abrasive material 12 by gravity, which may be suitably regulated in any desired manner to determine the thickness of the grit layer. The positioning of the abrasive material may be controlled at this point by the use of electrical orienting apparatus as shown in Figure 8 and hereafter more fully described. The sheet or web 6 is then trained over a roll 13 and reflexively bent upon itself by a roll 14, some of the grit in excess of that desired being removed by falling by gravity into a container 15. The web 6 with the layer of grit secured thereto by an adhesive, waterproof if desired, is then fed into a drying room or oven 16, and arranged in festoons 17 by the provision of rolls 18 in said drying room.

Figure 1A:
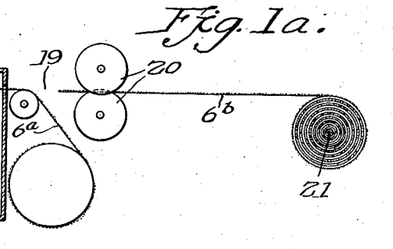
Figure 1a is a schematic view of a slitting and winding apparatus which may be used with the apparatus shown in Figure 1.

The temperature of the drying room is maintained at a degree which will only partially set the adhesive sufficiently to permit handling of the abrasive coated strip or sheet indicated at 6a as it leaves the drying room. At this point Figure 1 shows the sheet as broken, indicated at 19, inasmuch as it may be desired to store the resultant product at this point before continuing the same to the slitting apparatus. However, if it is desired to have a continuous making process, then the sheet or web is supplied to slitting apparatus represented by the cutting knives 20, as shown in Figure 1a. These knives may be arranged at any convenient distance apart, depending on the width or thickness of the strip to be cut and ultimately wound into the abrasive disc.

Figures 2, 3:
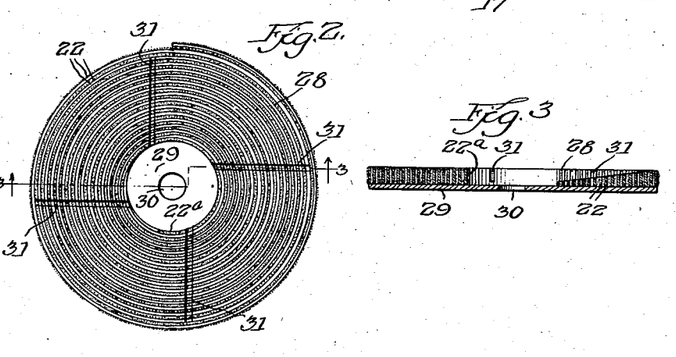
Figure 2 is a plan view of an abrasive disc made according to this invention.
Figure 3 is a transverse sectional view taken on the line 3—3 of Figure 2 looking in the direction indicated by the arrows.
Figure 4:
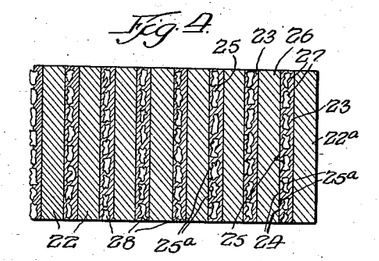
Figure 4 is an enlarged transverse sectional view taken on the line 3—3 of Figure 2 looking in the direction indicated by the arrows.

From the slitting apparatus the several resultant strips of abrasive sheet material may be fed to a mandrel 21, on which they may be wound into the final abrasive disc elements producing the articles such as shown in Figures 2, 3 and 4.

It will be understood that while the strip shown at 6b in Figures 1 and 1a is wound with the abrasive coated side outwardly, thus leaving an outer abrasive coated surface exposed at the last convolution, the disc may be as readily wound in the opposite direction so that the abrasive coated surface of each lamination will be presented inwardly. Inasmuch as these discs are intended to grind on one of their side faces, and as a substantially continuous abrasive coated surface is thus afforded, the discs may be wound either way desired.

It is also to be understood that by placing the strip 6b under more or less tension as desired, a tighter or looser wound disc may be obtained.

When the abrasive material is deposited by gravity as shown in Figure 1, it will be understood that the abrasive grains will be largely lying haphazard on the abrasive surface, though a large number of them will be oriented by the contact of the freshly coated surface with the roll 14, so that when the strip 6b is wound into a roll to form the disc the grains will be knocked down in such a manner that their sharper points will, as the disc is employed in grinding or polishing the surface, be brought against the surface of the work. However, to insure that the majority of the grits will be so oriented, we have provided methods and apparatus for so orienting the grains which will be described more fully hereinafter.

Figures 2, 3 and 4 illustrate a disc made according to this invention, wherein the disc is composed of a plurality of convolutions 22 of abrasive coated material affording a laminated abrasive structure. The laminations are held together by the adhesive material establishing contact on one convolution with the back surface of the adjacent convolution so that a structure somewhat similar to Figure 4 will be obtained, the innermost convolution 22a having its coating 23 of adhesive material contacting at a plurality of points, indicated at 24—24 with the back surface 25 of the immediately adjacent convolution 26. Thus the abrasive grains indicated at 27 in the layer of adhesive 23 are substantially embedded therein with their major axes and thus their sharper cutting points presented toward the margins of the laminations. In this way a substantially continuous abrading surface indicated at 28 on the surface of the disc is thus provided. It will be understood that care must be exercised that the proper weight of paper with regard to abrasive and adhesive be selected.

The disc-like structure thus provided may be secured to a flexible backing 29 of paper or cloth or other suitable material having an axial opening 30 by which the same may be attached to the rotating shaft of a grinding machine.

It will be understood that the backing 29 should be cemented to the disc by a flexible waterproof adhesive similar to that employed in the disc itself, or, if desired for some purposes, the backing 29 may be of a rigid material and the disc likewise cemented thereto.

In Figure 4, it will be understood, of course, that the thicknesses of the convolutions and layers of grit and adhesive have been greatly exaggerated in size, although it is conceivable that one might produce an abrasive article having convolutions whose thicknesses are as great as those shown in Figure 4. However, in the ordinary form of the invention for employment in standard surface grinding the disc is made up of a sheet not substantially greater in thickness than a sheet of ordinary sandpaper, thus lending to the final product a desired degree of flexibility.

It will be observed that in some instances it may be desirable to provide grooves in the abrading surface 28, these grooves being shown at 31 in Figures 2 and 3. It will also be noted that the grooves 31 are preferably of greater depths at their inner ends toward the axis of the disc than at their outer ends adjacent to the periphery of the disc. These grooves may be formed in the disc after the fabrication of the same inasmuch as forming the grooves in the strip prior to finally winding would require considerable care in aligning the notches in each convolution from which these grooves are formed.

The disc thus formed contains a number of voids which are afforded by virtue of the grit particles themselves holding the laminations apart and by the vacant places indicated at 25a where the glue or other adhesive does not completely fill the spaces between the convolutions. Thus the abrasive article quickly cleans itself as it works and clogging or loading of the article is practically impossible.

Figure 5:
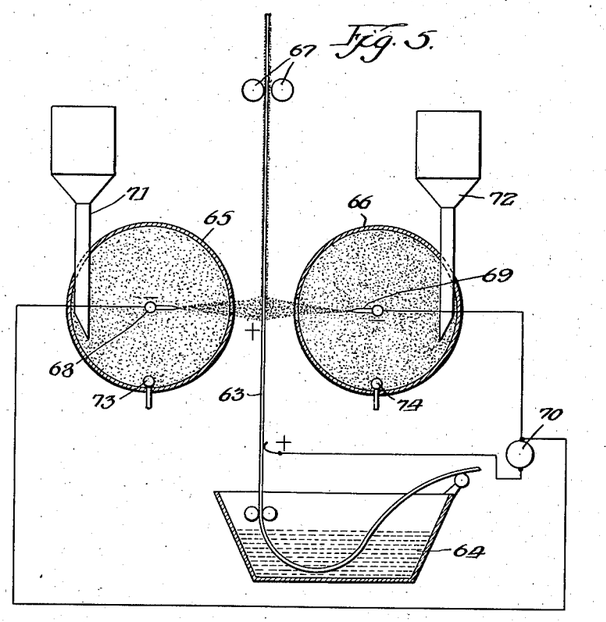
Figure 5 is a schematic view of apparatus for coating one or both sides of the abrasive article.
Figure 6:
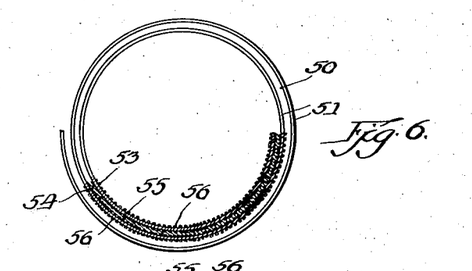
Figures 6 and 7 are fragmentary sectional views of an alternative form of an abrasive article made according to this invention.
Figure 7:
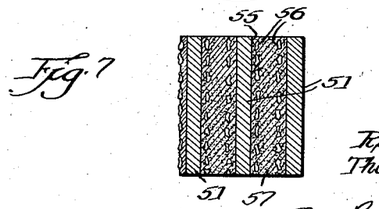

We have found that a satisfactory grinding and polishing wheel may be constructed by methods disclosed herein, and in one form of the invention, which is illustrated in Figures 6 and 7, we apply a coating of adhesive material containing an abrasive to both sides of the strip forming the flexible abrasive article. This coating operation may be accomplished by the apparatus shown in Figure 5.

After making a double coated strip, it is then wound loosely into a configuration substantially like that shown in Figures 6 and 7. The thus wound material is then thoroughly cured and dried. After curing, the disc-like structure then afforded is cemented to the cloth backing in such a manner as to preserve the open or spaced convoluted structure as shown. The polishing compound, which may be according to the formula appearing below, is then forced into the spaces between the layers and when completely filled with polish the disc is then allowed to set for sufficient time to solidify the polish base. This drying time, we find to give best results by subjecting the article to a drying temperature for approximately forty-eight hours.

A satisfactory formula which we have employed for the purpose of compounding the polishing material may be as follows:

| | Grams |
|---|---|
| Nitro base thinned to 50% solids | 200 |
| Dibutyl phthalate | 4.0 |
| 400 silicon carbide | 40.0 |
| Tripoli | 150.0 |
| Borax | 16.0 |
| Erkalin | 4.0 |

From the foregoing it will be observed that we produce a convoluted structure indicated generally at 50, composed of the laminations of the convolutions 51 of suitable fabric coated on both sides as indicated at 53 and 54 with adhesive 55 containing the comminuted abrasive material 56.

It will be noted that sufficient space is afforded between the layers 51 particularly as shown in Figure 7 to permit of the introduction of a comminuted polishing material indicated at 57. Thus the finished article possesses both grinding and polishing properties.

It will be understood that it is highly desirable that the comminuted abrasive material be disposed on the strip or sheet in such manner that the individual grits will have their major axes preferably lying parallel with the surface of the sheet, and, where the sheet is to be wound later to form a disc which marginally exposes an edge of the sheet for forming the abrasive surface, that the grits be perpendicular or substantially perpendicular to the longitudinal margins of the sheet.

While orientation of the grits with their major axes parallel with the surface of the sheet and substantially perpendicular to the edges thereof, may be more or less accomplished in simple gravity deposition of the grits on the adhesive coated sheet, a positive orientation of the individual grains may be accomplished by electrical action, that is to say, the grits may be deposited on the sheet in the presence of an electrical field, for example electrostatic, or if the grit particles are of a magnetically responsive nature then in the presence of an electro-magnetic field. Grits deposited in the presence of such an electrical field will be caused to align themselves with the lines of force of the electro-magnetic or electrostatic field as the case may be.

For most abrasive articles an electrostatic field will perform the function inasmuch as most of the grit particles commonly employed in the abrasive arts are of a non-magnetic character and are non-conductors and practically all will respond to the force of an electrostatic field.

Referring specifically to Figure 5, we provide a suitable backing for carrier strip 63 which receives coats of adhesive material on both sides thereof from a suitable tank 64, the strip being conducted upwardly between two chambers 65 and 66 and then conducted through edge guide rollers 67.

In the chambers 65 and 66 there are provided electrodes 68 and 69 of preferably negative polarity, the sheet being itself of a conductive nature and connected to the positive side of a source of electric motive force indicated at 70.

The apparatus receives grit from hoppers 71 and 72 which is agitated in the form of clouds within the chambers 65 and 66 by air blasts introduced at the nozzles 73 and 74.

The apparatus shown in Figure 5 is similar to that shown in the patent to Smyser 1,788,600, and serves to illustrate one apparatus for carrying out the double coating simultaneously. This form of the apparatus does not, however, produce orientation of the grit particles with their major axes parallel to the plane of the sheet, and reference will be made hereinafter to forms of the invention including apparatus for this purpose.

It will be understood that the sheet may be coated on both sides by running it twice through either a gravity coating apparatus or any of the apparatus shown in the other figures of the drawings.

As herein pointed out, it is desirable to orient the grit particles so that they will lie with their major axes substantially parallel to the surface to be coated, and they will thus present their sharp points at the edges of the strip as the same becomes worn in use as an abrading disc.

This orientation of the particles uniformly on the sheet is also of utility in the manufacture of mineral coated shingles wherein it is desirable that the particles of mineral, granules or the like, be deposited so that a minimum number of the mineral granules is required to cover a given area of the asphaltum sheet or other material from which the carrier or backing of the shingle is made.

We have illustrated herein a number of ways in which this may be accomplished which are all included in the disclosures of Figures 8 to 12, both inclusive, and Figures 14 to 18, both inclusive, it being understood that these electrical orienting devices are to be used in the general apparatus shown in Figures 1 and 1a at the point indicated by the hopper 11.

Figure 9:
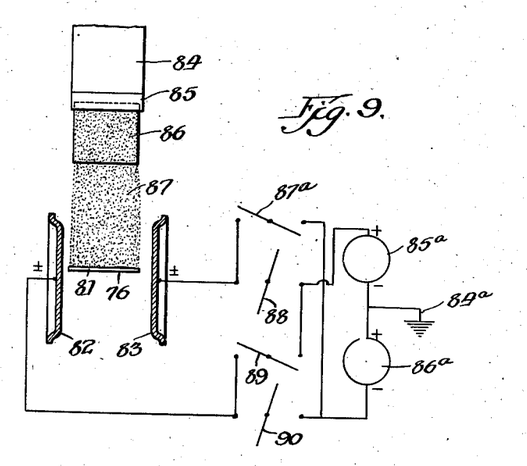
Figure 9 is a view showing the apparatus of Figure 8 from another aspect.

With reference first to Figures 8 and 9, we have employed a backing 76, of suitable material which receives a coating on the upper surface of the horizontal flight thereof shown in Figure 8, this coating being applied from a set of adhesive distributing or applying rollers 77, 78 and 79, the latter taking up adhesive from a tank 80. This adhesive layer is indicated at 81 and the backing is then propelled to the left as viewed in Figure 8 between electrodes forming an electrostatic field.

These electrodes, we have found, may conveniently comprise a pair of circular disc-like plates 82 and 83, between which the horizontal flight of paper 76 passes at a desired rate of speed. Other forms of the plate electrodes may be employed, but we have found that this type produces a uniform field and highly satisfactory performance.

Above the flight 76, and at a distance sufficiently remote from the electrodes so as to be substantially unaffected thereby, we provide a hopper 84, which may contain abrasive grains of the desired size. We find that for our apparatus an abrasive grain or pulvule of a slivery character that is somewhat elongated, will give highly desirable results as to orientation, though it will be understood that it is not necessary that this type of pulverulent material be employed in order to attain the results of this invention. Practically all of the grits employed in the abrasive industry today are characterized by having a major and a minor axis so that they become responsive to the action of an electrical field when introduced into the presence of the same.

These grits are deposited by gravity from a hopper 84 having a suitable controlling gate 85 over a distributing roller 86 so that they fall in a substantially continuous stream 87 toward the adhesive surface 81, passing between the electrodes 82 and 83 in their path to the adhesive surface.

We have discovered that a static electrical field solely, that is to say, without outside influence, mechanical or otherwise, acting upon the grit particles, tends to deflect them toward one of the plates, and in order to correct this and produce a more uniform distribution and yet obtain orientation, we employ a pole changer, diagrammatically illustrated in Figure 9, through which the two electrodes 82 and 83 are connected to the source of electrical difference of potential.

A source of electromotive force, preferably of relatively high voltage, is provided. The voltage employed in one arrangement of the electrodes was about 105 kilovolts and in employing this voltage the plates or electrodes were spaced about 5.5 inches apart in air. This arrangement served to maintain a constant electrical potential gradient of approximately 19 kilovolts per inch between the electrodes.

In correcting for uneven distribution, the electrical center of the source of difference of potential is grounded as indicated at 84a in Figure 9, and the source composed of two units 85a and 86a is so connected through pole changing switches 87a, 88, 89 and 90 that the relative polarity of the two plates 82 and 83 forming the electrostatic field was changed at a desired frequency.

We have found that, for our purposes, with the plates spaced between 5 and 6 inches apart in air, the best results are obtained by the use of electrical potential gradients of the range of from 17 to 20 k. v. per inch. We also find that where reversal of polarity is resorted to, as in the disclosure in Figure 9, the optimum of frequency of polarity change or reversal should be in the vicinity of two cycles per second. However, we have found that ranges of from one cycle per second to four cycles per second produce satisfactory results and that little change was noted in thereby producing satisfactory distribution and orientation of grit particles on the sheet.

It will be understood that the foregoing disclosure of values as to voltages, rates of polarity change, and size of and distance between the plates is all subject to variation to suit the particular conditions and results to be attained thereby.

We have also found that with different types of abrasive grains different results were obtained. For example, with silicon carbide in some arrangements of the plates compensation had to be made for difficulty encountered due to the high conductivity of silicon carbide, where as with certain other grit particles these difficulties were not found present, such, for example, as in the use of flint.

From the foregoing it will be understood that the electrostatic field established either constantly or intermittently together with reversal of polarity between the plates 82 and 83 affects the grit particles, as they enter the electrical field, to bring them into axial alignment with the lines of force of this field. No appreciable difficulty is found to exist by the presence of the backing material 76 in the field, which would ordinarily be assumed to occur due to the setting up of extraneous electrostatic fields between the two electrodes and the backing itself, this difficulty being eliminated by the form of the electrodes, so that the major value and resultant force of the electrical field is retained.

In the more convenient form of the invention shown in Figure 9, successful results will be obtained by employing disc-like electrodes 82 and 83 of a diameter of about 8 inches, and with the opposed faces of the electrodes substantially parallel to each other.

Figure 10:
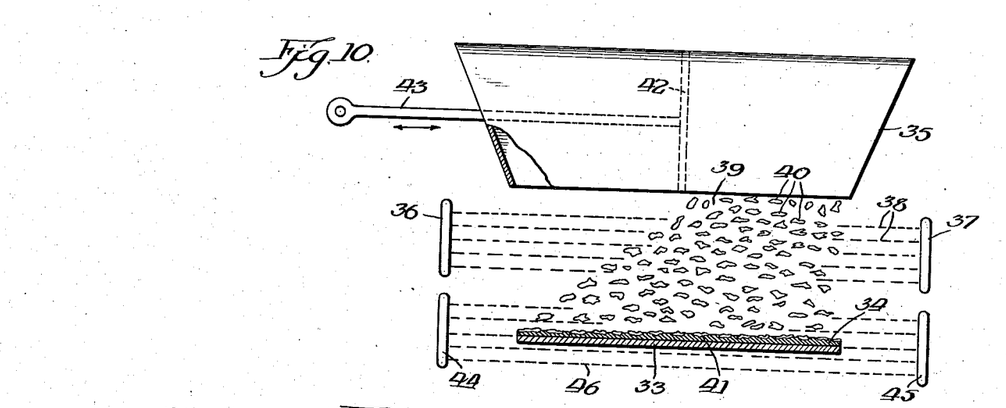
Figure 10 is an elevational schematic view illustrating alternative apparatus for carrying out the step of orientation of the abrasive particles.

A further form of apparatus which we may employ for carrying out this method of deposition is illustrated in Figure 10 wherein the strip, sheet or web of Figure 1 is indicated at 33, the one side of said sheet being provided with a layer 34 of adhesive material, preferably waterproof in its characteristics, though, as will be obvious, this layer of adhesive may be of the ordinary blue bond type employed in the sandpaper industry for non-waterproof abrasive articles.

The sheet 33 is caused to travel in a substantially horizontal plane below a hopper 35 and between the electrodes 36 and 37 of an electrical field, the electrodes 36 and 37 being connected to an appropriate source of electrical potential of the required value. In actual practice what are known as high voltages may be required, though it will be understood that the difference of potential to be employed is subject to variation as desired for accomplishing the ultimate desired action.

For the purpose of the present disclosure the electrodes 36 and 37 form part of an electrostatic field, that is to say, a field in which a constant stress is set up but in which relatively small currents flow. Such an electrical field will be established between the electrodes 36 and 37 indicated generally by the lines of force 38. This field is set up between the electrodes 36 and 37 above the sheet 33 and below the hopper 35, and the field strength is regulated to such an extent as to act upon the abrasive particles as they are fed from the hopper 35.

The abrasive particles are shown as a cloud 39 but some of them are shown enlarged at 40 depicting the approximate positions which they assume as they fall by gravity through the electrostatic field. It will be understood that should the electrostatic field be of great enough strength, the particles issuing from the right hand end as shown in Figure 10, would be cause to orient themselves with their major axes parallel with the lines of force of the electrostatic field and be projected by that field from one of the electrodes toward the other thereof. Therefore, by regulating the electrostatic field to the desired optimum the particles will be caused merely to flatten out, and while they may, under these circumstances be caused to travel along the lines of force of the field, the force of gravity will tend to overcome their flight toward the oppositely charged electrode and they will fall upon the layer of adhesive, assuming positions substantially as shown in Figure 10, and indicated at 41. This orientation is more uniformly accomplished, however, in the form of the apparatus shown in Figures 8 and 9.

Inasmuch as the particles of abrasive material as they leave the hopper adjacent to the electrode 36, may in a large number of instances never reach the sheet, due to their attraction to the other electrode, we provide a movable partition 42 in the hopper, which may be adjusted transversely of the longitudinal axis of the sheet so that the length of the slot in the bottom of the hopper may be varied to cause the grit particles to issue through only a portion of said slot.

A suitable handle properly insulated indicated at 43 may be employed for reciprocating the partition 42 and for adjusting same to the desired position.

In some instances the particles of grit will take on charges which may tend to cause them to induce a charge in the sheet and thus the particles would land on the sheet substantially perpendicular to the plane of said sheet. In order to avoid this as much as possible and to counteract a tendency for the particles to assume positions perpendicular to the sheet, the electrodes 36 and 37 may be supplemented by auxiliary electrodes 44 and 45 which may have a voltage regulated (by means not shown) to exert a sufficient electrostatic field effect or action to prevent the particles from taking undesirable positions just as they strike the glue. If desired, this auxiliary field whose lines of force are indicated at 46, may be extended a desired distance beyond the point of actual deposition so that it will function for a period of time after the sheet has moved beyond the effect of the major electrostatic field.

Inasmuch as the poles or electrodes 36 and 44 and 37 and 45 are of like signs, there will be no tendency to set up extraneous electrostatic fields between these electrodes other than substantially ineffective electrostatic or electro-magnetic fields, as the case may be, due to difference in actual potential of the two fields 38 and 46. In any event, inasmuch as the electrostatic fields employed have their lines of force substantially parallel, the effect of any extraneous field set up between the electrodes 36 and 44 and 37 and 45 should be substantially negligible in disturbing the desired deposition and orientation of the particles on the sheet.

Figure 11:
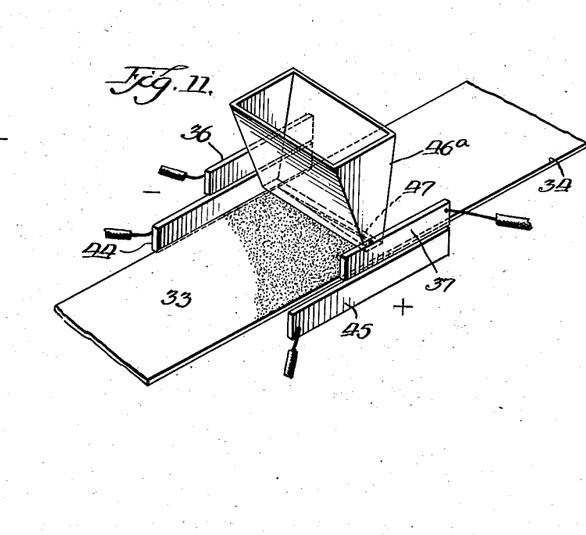
Figure 11 is a perspective view of an alternative form of apparatus of this invention.

An illustration of one arrangement of the electrodes which will set up the desired electrical action is shown in Figure 11 in perspective. Of course in some instances it may be desired to eliminate the secondary electrostatic field 46 and by proper control of the moving partition 42 the desired results may be attained as to ultimate effect of the field on the grit particles.

Figure 11 serves to illustrate a further modified form of the hopper. In this form the hopper is of a general V-shape cross section and the bottom thereof being open is provided with a tapering slot indicated at 47. The slot is of greater dimensions at one end than at the other end so that by proper positioning of the hopper the particles of abrasive acted upon by one of the electrodes and tending to be projected toward the other thereof would be counteracted by the tapering slot in the hopper, thus preventing piling up of the abrasive grit at one margin of the sheet.

It will also be understood that by regulating the height of the hopper 46a from the sheet that different effects may be obtained to the point where the desired orientation and deposition of the grit is attained.

The electrodes 44 and 45 may be employed in Figure 11 as in Figure 10 if that be found necessary under the circumstances.

Figures 12, 13:
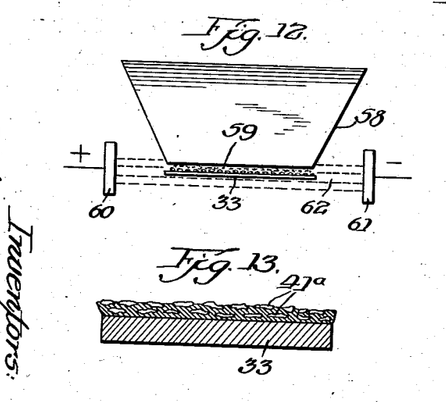
Figure 12 is an elevational view of a still further modified form of the invention.
Figure 13 is an enlarged sectional view of a sheet illustrating the alignment of the abrasive grains thereon.

Referring now to Figure 12, the apparatus here shown discloses a hopper 58 into which the comminuted abrasive material and an adhesive material in plastic form are introduced. The hopper may be suitably heated to maintain the adhesive material in a liquid state so that it will flow from a suitable opening 59 provided in the bottom of the hopper.

As the incorporated grit and adhesive material flow from the hopper on to the sheet 33, the mass is subjected to the force of an electrostatic field 62 set up between the electrodes 60 and 61 thus orienting the particles of grit contained in the adhesive according to their electrical responsiveness to such a field, that is to say, the grits having major and minor axes, as hereinbefore pointed out, will under the influence of the electrostatic field become aligned with the lines of force 62 shown in Figure 12, while in the glue or other adhesive and thus be carried by the glue or adhesive on to the sheet where they will be deposited with their major axes substantially parallel with the plane of the sheet and substantially perpendicular to the margins thereof.

Figure 13 shows the sheet made according to the methods herein described and it will be observed that in many instances a plurality of layers of grit may be provided and for this reason a sheet such as that shown in Figure 13 is illustrated having two or more layers 41a of grit material and adhesive material deposited thereon.

In order to make clear to those skilled in the art the basic principles involved in employing the electrostatic field for the purposes of the present invention, Figures 14 to 18 have been incorporated in this disclosure showing the various steps in development to obtain the optimum of results in deposition, distribution and orientation of the abrasive particles.

It will be understood that these Figures 14 to 18 all illustrate methods for producing deposition, distribution and orientation, but that some produce better results than others as will appear from the following description.

Figure 14:
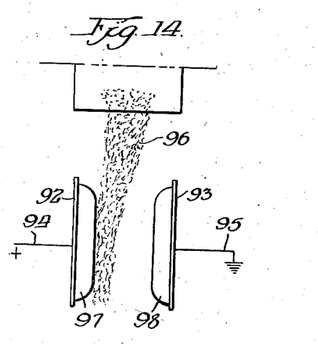
Figures 14, 15, 16, 17, 17a, 18, 18a and 19 are all diagrammatic views of alternative forms of the invention shown in Figures 8 and 9.

On reference to Figure 14, a pair of electrodes, preferably in the form of circular discs 92 and 93 are employed, one of these discs being connected to the positive side, such as at 94, of a source of difference of electrical potential and the other disc being connected to the negative side or ground as the case may be.

A relatively high difference of electrical potential was thus impressed on the two plates establishing an electrostatic field between them, into which abrasive particles 96 were introduced, either by gravity as shown in Figure 14, or by any other suitable means, so as to produce a stream of the particles as they enter the electrostatic field established between the plates 92 and 93.

This pair of substantially circular metal plates are made about 8 inches in diameter and provided with curved edges indicated at 97 and 98, thus preventing excessive concentration of the field at the edges of the plates thereby reducing the possibility of sparking between the plates.

These electrode plates were spaced about 5.5 inches apart in air and were connected to a source of electromotive force approximately 105 kilovolts, so that a substantially constant electrical potential range of about 19 kilovolts per inch was maintained between them.

The mineral pulverized material (in one instance grade 80 silicon carbide) was deposited so as to fall in a stream between the two plates 92 and 93.

When either of the plates is grounded, the mineral stream which was originally at ground potential is deflected toward the ungrounded plate, so that if an adhesively coated strip was introduced between the plates 92 and 93, while orientation of the particles transversely of the strip was attained, yet deposit of mineral would take place in excess at one edge over that at another edge of the strip.

To overcome this uneven distribution of particles, the plates may be connected to the source of potential through a reversing switch or pole changer which alternately serves to connect each plate to ground and to high potential, in other words, supply an alternating voltage to said plates.

Figure 15:
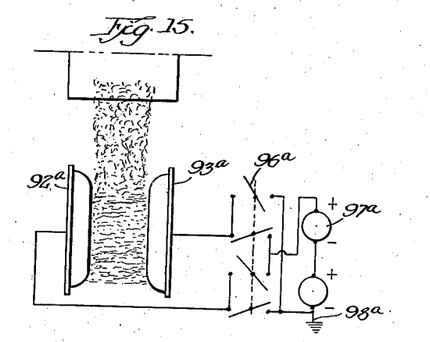

One manner of accomplishing this is disclosed in Figure 15, in which the plates 92a and 93a are connected through a pole changing apparatus 96a to a source of relatively high electrical potential, 97a.

The stream of mineral at low frequencies of reversal of polarity moved from one plate to the other following the reversals of polarity of electrical potential so that over a given period of time (say one electrical cycle) the air space between the electrodes 92a and 93a was substantially uniformly filled with mineral particles.

The source of electrical energy 97a is so arranged in this circuit that one side 98a thereof is connected to ground.

Figure 16:
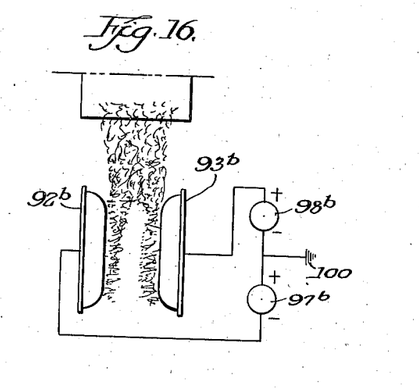

In the case of Figure 16, the plates 92b and 93b are so arranged in the circuit that one of them is connected to one of the sources of difference of potential indicated at 97b and the other to the other source indicated at 98b, the electrical centre of the sources indicated at Figure 16 being grounded as at 100. In this arrangement the main mineral stream becomes divided into two separate streams each of which tended to flow toward one of the plates thereby leaving a low mineral concentration in the space midway between the plates.

From the foregoing Figures 14, 15 and 16 it will be observed that we are enabled by adjustments and variations in the intensity of the electrical field and by its polarity and/or periodicity of change and by other adjustments, to regulate what will happen to the mineral grits as they are introduced into the electrical field. Thus where it is desirable that the grits be more heavily deposited at one portion of the adhesive coating backing than at another portion this can be regulated to a desired degree as required.

Should it be desired to prevent excess deposition of the grit in predetermined areas, then the form of the invention shown in Figure 9 and hereinabove described may be employed. For the purpose of manufacturing abrasive discs as disclosed herein this form of the invention finds utility.

Figure 17:
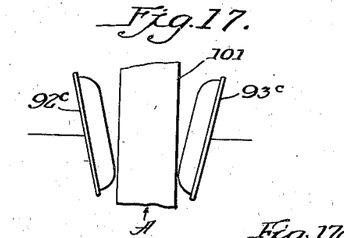
Figure 17A:
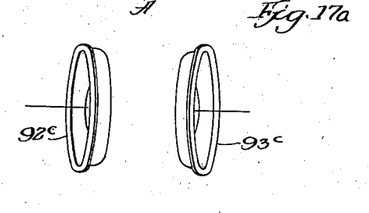

In Figures 17 and 17a, a further alternative arrangement of the electrode plates is disclosed Figure 17 being a view looking down on the plates, the backing element being indicated at 101 and the plates at 92c and 93c. Figure 17a is a view looking inwardly in the direction indicated by the arrow A.

In Figures 17 and 17a we disclose the electrodes arranged in convergent planes so that some portions of the surfaces of the discs were closer together than other portions, the purpose being to further allow for adjustment in distribution of the grit particles.

The grit particles entering this electrostatic field are subjected to a variation in potential gradient from 17 k. v. per inch to 24 k. v. per inch, or any other variation of the electrical potential gradient, depending upon the voltages employed, size of plates, etc.

The stream of mineral is allowed to fall into the zone whose gradient is about 19 k. v. per inch. There is in such circumstances apparently no tendency for the mineral particles to migrate toward the zone of high gradient, and the general dispersion and orientation of the particles is not materially interfered with and not materially different from that where the plates are substantially parallel, and the potential gradient therefore substantially uniform.

Successful results may be obtained with any of the foregoing arrangements, by the employment of an abrasive grit of a grade 1½ flint, preferably of a splintery nature.

We find that a higher electrical potential gradient may be maintained without disruptive discharge or so-called spark-over with flint, for example, than with other grits such as silicon carbide, inasmuch as in the same air space potential gradient and with the same relative quantity of grit introduced thereinto, the conductivity of silicon carbide, being higher than that of flint, tends to produce an increased tendency to spark-over or brush discharge, as it is sometimes termed, and care must in some cases be exercised to prevent the formation of a conducting path between the plates.

Figure 18:
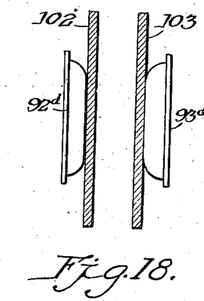
Figure 18A:
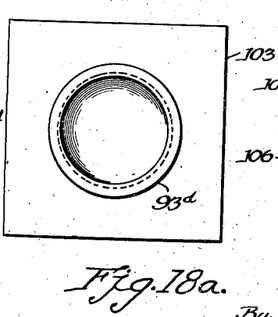

A method of overcoming this difficulty for certain purposes is shown in Figures 18 and 18a, wherein the two plates 92d and 93d were arranged on opposite sides of insulating plates 102 and 103.

While the employment of these plates finds value with certain minerals, there is no marked difference in the action of the electrostatic field with other minerals, and we have found this arrangement of Figures 18 and 18a to be of value in increasing the activity of flint, but of much less perceptible value in increasing the activity of silicon carbide, inasmuch as spark-over or brush discharge sometimes occurs which causes the greater part of the applied voltage to be built up across the insulation.

The observed motion of the particles was substantially the same with or without the insulation, but, as pointed out in the case of some abrasive particles, an increased activity without a resultant brush discharge was observed. The plates also serve as a means to mechanically confine the activity of the particles to the area within the plates.

Figure 19:
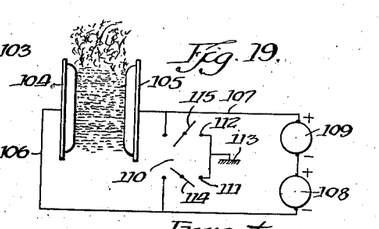

Referring now more particularly to the form of the invention shown in Figure 19, it will be observed that here may be provided a form of the apparatus wherein the electrode plates are alternately connected to ground. In this form of the invention the plates indicated at 104 and 105 are connected by conductors 106 and 107 to the negative and positive sides, respectively, of sources of electrical difference of potential 108 and 109, that is, sources of potential being connected in series as shown.

A grounding switch is provided indicated generally at 110 and has its terminals 111 and 112 thereof connected to ground as indicated at 113, switching members 114 and 115 serving to alternately connect the conductors 106 and 107 with ground.

It will be seen from the form of the invention disclosed in Figure 19 that by the alternative grounding of the plates 104 and 105, the orienting force exerted on the particle is uniformly maintained by virtue of the maintenance of a constant gradient between the plates. Dispersion of the particles thus uniformly obtained by the use of the switching arrangement prevents the bulk of the particles (which, it will be understood, are at ground potential when they pass into the zone of the plates) from being directed more to one plate than to the other.

The form of the invention shown in Figure 19 operates similarly to the form of the invention shown in Figure 9.

Reverting to the form of the invention disclosed in Figures 8 and 9, the structure there employed including a reversal of polarity does not include the insulating plates and these, under ordinary circumstances, are not required.

Under conditions shown in Figure 14 and without the use of insulation on the plates or between them, flint particles dropped into the field whose gradient was 15 k. v. per inch were fairly well oriented on the sheet but the distribution is not entirely uniform.

An increase in gradient from 15 to 17.5 k. v. per inch resulted in the production of a marked increase in the degree of orientation, but as well increased the inequality of distribution.

With abrasive grains of silicon carbide a limitation of the potential gradient was required so as to prevent dielectric breakdown.

The use of insulation on the plates serves to cause the mineral to be more evenly distributed, but it will be understood that some slight amount of orientation must be sacrificed owing to the slight reduction in the potential gradient caused by the employment of the insulating plates.

From the foregoing it will be observed that by adjustment of the electrostatic field value and/or adjustment of the plates with respect to the air space between them and/or their angularity with respect to each other, and/or the periodicity of polarity reversal, we are enabled to produce desired effects in the orientation and distribution of the grit particles on the sheet.

Where the particles are deposited on shingle material for the purpose of roofing shingles and the like, it will be observed that by causing them to lie flat on the adhesively coated sheets, such as an asphaltum adhesive sheet or the like, the employment of a lesser number of particles to cover a given area of the shingles is required.

Having thus described our invention and illustrated its use, what we claim as new and desire to secure by Letters Patent is:

1. The process of coating an adhesively coated backing material with elongated particles with their longer axes substantially in parallelism to the backing which includes as steps thereof feeding a carrier or backing and applying an adhesive layer to a suitable surface thereof, and depositing on said adhesive layer a pulverulent abrasive grit of elongated nature in respect to their major axes under the influence of an alternating electrical field whose lines of force at and adjacent to said carrier have an orienting effect on the particles to position them substantially parallel to said surface thereof.

2. Apparatus for coating adhesive backing material with elongated particles with their longer axes substantially in parallelism to the backing surface including spaced electrodes adapted to be connected to a source of uni-directional electrical difference of potential, means for supplying abrasive particles or the like to the vicinity of said electrodes, a pole changer interposed in the circuit of said electrodes, and means for guiding an adhesive coated backing adjacent to said electrodes for positioning the backing edgewise with respect to said electrodes.

3. Apparatus for coating adhesive backing material with elongated particles with their longer axes substantially in parallelism to the backing surface comprising, in combination, spaced electrodes adapted to be connected to a source of alternating electrical difference of potential, means for feeding an adhesive coated backing element between said electrodes to guide the backing within the field between said electrodes and to direct the backing substantially edgewise with respect to the electrodes and means for delivering abrasive particles in a stream toward said backing and between said electrodes.

4. Apparatus of the character described, in combination, spaced electrodes adapted to be connected to a source of electrical difference of potential, means for feeding an adhesive coated backing element between said electrodes to guide the backing substantially edgewise in respect of said electrodes, means for delivering abrasive particles in a stream toward said backing and between the said electrodes, and means for alternately grounding said electrodes.

5. The process of coating which includes as steps thereof feeding a carrier or backing and applying an adhesive layer to a suitable surface thereof, and depositing on said adhesive layer roofing granules having elongated dimensions under the influence of an alternating electrical field whose lines of force at and adjacent to said carrier have an orienting effect on the granules to position them substantially parallel to said surface thereof.

6. The process of coating which includes as steps thereof feeding a carrier or backing and applying an adhesive layer to a suitable surface thereof, and depositing on said adhesive layer particles of finely divided material having unequal axes under the influence of an alternating electrical field whose lines of force at and adjacent to said carrier have an orienting effect on the particles to position them substantially parallel to said surface thereof.

7. In the process of depositing particles of finely divided material of elongated nature in respect of their major axes upon a surface with their longer axes substantially in parallelism to the surface wherein said particles are subjected to the influence of an electrical field during their deposition, the step which includes reversing the polarity of said field intermittently during the deposition so as to prevent the stream of particles from being thrown out of the desired zone of deposition by the action of said field.

8. Apparatus for coating adhesive backing material with elongated particles with their longer axes substantially in parallelism to the backing surface comprising, in combination, spaced electrodes adapted to be connected to a source of alternating electrical difference of potential, said electrodes being covered with an insulating material minimizing the formation of a conducting path between the electrodes, thereby localizing and minimizing spark-over tendencies, means for feeding an adhesive coated backing element between said electrodes to guide the backing substantially edgewise in respect to said electrodes and means for delivering abrasive particles in a stream toward said backing and between said electrodes.

RICHARD PAUL CARLTON.
THEODORE JOSEPH MILLER.